(12) United States Patent
You

(10) Patent No.: US 12,388,193 B2
(45) Date of Patent: Aug. 12, 2025

(54) ANTENNA DEVICE AND RADAR DEVICE WITH THE SAME

(71) Applicant: HL KLEMOVE CORP., Incheon (KR)

(72) Inventor: Kyung Jin You, Gyeonggi-do (KR)

(73) Assignee: HL KLEMOVE CORP., Incheon (KR)

( * ) Notice: Subject to any disclaimer, the term of this patent is extended or adjusted under 35 U.S.C. 154(b) by 373 days.

(21) Appl. No.: 17/953,308

(22) Filed: Sep. 26, 2022

(65) Prior Publication Data

US 2023/0253718 A1 Aug. 10, 2023

(30) Foreign Application Priority Data

Feb. 10, 2022 (KR) .......................... 10-2022-0017421

(51) Int. Cl.
*H01Q 21/08* (2006.01)
*H01Q 1/24* (2006.01)

(52) U.S. Cl.
CPC ............. *H01Q 21/08* (2013.01); *H01Q 1/247* (2013.01)

(58) Field of Classification Search
CPC ........ H01Q 21/08; H01Q 1/24; H01Q 21/065; H01Q 1/3233; G01S 13/931
See application file for complete search history.

(56) References Cited

U.S. PATENT DOCUMENTS

| 2016/0025839 A1 | 1/2016 | Trummer |
| 2019/0011532 A1 | 1/2019 | Loesch et al. |
| 2019/0391230 A1* | 12/2019 | Loesch .................... G01S 13/42 |
| 2021/0239788 A1* | 8/2021 | Arage ..................... G01S 7/032 |
| 2022/0163623 A1* | 5/2022 | Kishigami .............. G01S 7/032 |

FOREIGN PATENT DOCUMENTS

| KR | 10-2015-0127188 | 11/2015 |
| KR | 10-2017-0080572 | 7/2017 |
| KR | 10-2018-0116325 | 10/2018 |
| KR | 10-2019-0037083 | 4/2019 |
| KR | 10-2019-0093647 | 8/2019 |

OTHER PUBLICATIONS

Office Action dated Mar. 7, 2024 for Korean Patent Application No. 10-2022-0017421 and its English translation from Global Dossier.
Notice of Allowance dated Sep. 6, 2024 for Korean Patent Application No. 10-2022-0017421 and its English translation from Global Dossier.

* cited by examiner

*Primary Examiner* — Ladimir Magloire
*Assistant Examiner* — Anna K. Gosling
(74) *Attorney, Agent, or Firm* — WOMBLE BOND DICKINSON (US) LLP

(57) ABSTRACT

The embodiments relate to an antenna device and a radar device including the same. There may provide an antenna device and a radar device in which a plurality of receiving antennas are disposed at the same vertical and horizontal intervals and a plurality of transmission antennas are arranged to be located in an area outside the receiving antenna, so that it is possible to minimize the space occupied by the antenna while uniformly creating an arrangement interval of the virtual antennas.

15 Claims, 7 Drawing Sheets

ANTENNA DEVICE AND RADAR DEVICE WITH THE SAME

CROSS REFERENCE TO RELATED APPLICATION

This application claims priority from Korean Patent Application No. 10-2022-0017421, filed on Feb. 10, 2022, which is hereby incorporated by reference for all purposes as if fully set forth herein.

TECHNICAL FIELD

An embodiment of the present disclosure relates to an antenna device and a radar device with the same.

BACKGROUND

Recently, consumers have a lot of interest in the performance and safety of vehicles. As the demand for vehicle performance, driver convenience, and safety increases, there is continuously in progress the research and development of advanced driver assistance systems (ADAS) for assisting the driver in driving the vehicle by controlling the vehicle. Here, the advanced driver assistance systems (ADAS) may allow the driver to take appropriate actions based on external environmental information detected by vehicle sensors and cameras, or may automatically control the vehicle, minimizing or blocking damage caused by vehicle accidents by establishing a safer driving environment.

In addition, the vehicle radar device may be used to measure the distance, relative speed and direction angle of other vehicles and stationary objects through ambient monitoring in driver assistance systems or autonomous driving systems. Specifically, the radar device may detect the azimuth of the object, that is, the angle between the line of sight to a target and the vehicle front direction on the horizontal plane to enable determination of whether the vehicle is drivable or whether the target is an actual obstacle. Accordingly, the radar device may have a structure in which a plurality of physically separated receiving antennas are arranged in order for the radar sensor to have high angular resolution characteristics. However, the radar device having such an array structure has a problem in that the size of the antenna increases and a number of related elements are required for the transceiver, so that the overall size increases. In particular, the vehicle radar device has a problem in that the size of the radar device is limited since a portion for mounting the radar device is limited by various structures such as a license plate, a fog lamp, and a support structure.

In this regard, in the case of a multiple-input multiple-output (MIMO) radar, which has been recently developed for miniaturization of radars for vehicles, the same performance can be achieved while reducing the number of RF chips by extending the aperture of the receiving antenna by appropriately arranging the interval between the transmission antennas. However, such a vehicle radar device has a problem in that cost and complexity increase. In particular, if a multiple-input multiple-output (MIMO) radar is configured using a monolithic microwave integrated circuit (MMIC) including transceiver components, there is a need for an arrangement method for minimizing the length of the feed line due to the arrangement space of the MMIC and uniformly forming an arrangement interval of virtual antennas by using a plurality of antennas.

Therefore, there is a demand for an antenna device capable of minimizing the space occupied by a plurality of antennas while maintaining the radiation efficiency of the antenna, and a radar device including the same.

SUMMARY

Embodiments of the present disclosure provide an antenna device capable of minimizing the space occupied by a plurality of antennas while maintaining the radiation efficiency of the antenna, and a radar device including the same.

In an aspect of the present disclosure, the present embodiments may provide an antenna device used in a radar device including a receiving antenna device in which a plurality of receiving antennas are arranged in two stages at the same vertical interval in a first direction and sequentially arranged to have the same horizontal interval in a second direction, and a transmission antenna device disposed such that a plurality of transmission antennas are located in an external area with respect to the receiving antenna device.

In another aspect of the present disclosure, the present embodiments may provide a radar device including an antenna device including a receiving antenna device in which a plurality of receiving antennas are arranged in two stages at the same vertical interval in a first direction and sequentially arranged to have the same horizontal interval in a second direction and a transmission antenna device disposed such that a plurality of transmission antennas are located in an external area with respect to the receiving antenna device, and a controller configured to transmit a transmission signal from at least one of the plurality of transmission antennas and acquire information on an object by processing a reflection signal reflected from the object through the plurality of receiving antennas.

According to embodiments of the present disclosure, it is possible to provide an antenna device capable of minimizing the space occupied by a plurality of antennas while maintaining the radiation efficiency of the antenna, and a radar device including the same.

DETAILED DESCRIPTION

Figure 1:
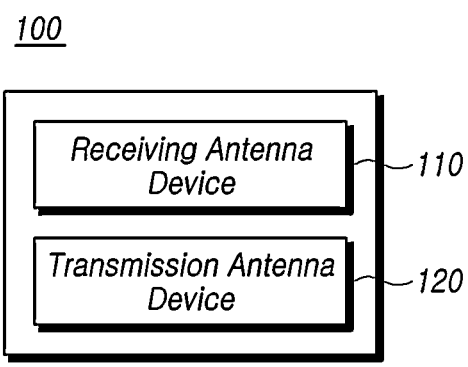
FIG. 1 illustrates a configuration of an antenna device according to an embodiment of the present disclosure.

The present disclosure relates to an antenna device and a radar device including the same.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

In the present specification, "first direction" and "second direction" may be perpendicular to each other. For example, if the "first direction" is a direction perpendicular to the ground, the "second direction" may be a direction horizontal to the ground perpendicular to the first direction.

In addition, each of "transmission antenna" and "receiving antenna" in the present specification may be an antenna configured with at least one or more patch antennas, respectively, and may be a microstrip patch antenna or a waveguide antenna. However, the type of antenna is not limited thereto.

FIG. 1 illustrates a configuration of an antenna device according to an embodiment of the present disclosure.

Referring to FIG. 1, an antenna device 100 used in a radar device may include a receiving antenna device 110 in which a plurality of receiving antennas are arranged in two stages at the same vertical interval in a first direction and sequentially arranged to have the same horizontal interval in a second direction, and a transmission antenna device 120 disposed such that a plurality of transmission antennas are located in an external area with respect to the receiving antenna device.

For example, in the receiving antenna device 110, the plurality of receiving antennas may be arranged in two stages at the same vertical interval in the first direction and sequentially arranged to have the same horizontal interval in the second direction. As an example, in the receiving antenna device 110, the plurality of receiving antennas may be divided into an upper stage and a lower stage in the first direction and arranged in two stages, and each stage may include at least eight or more receiving antennas. In addition, in the receiving antenna device, the plurality of receiving antennas may be spaced apart from each other by the vertical interval of a first interval, and may be arranged to be spaced apart from each other at the horizontal interval of a second interval. Here, each interval is set based on the wavelength of the transmission signal. The first interval may be N multiples of four wavelengths 4λ, and the second interval may be N multiples of three wavelengths 3λ. Specifically, the plurality of receiving antennas included in the receiving antenna device 110 may be spaced apart to have a vertical interval of 4N times the wavelength of the transmission signal, and may be spaced apart to have a horizontal interval of 3N times the wavelength of the transmission signal. Here, N may be set to any real number between 0.5 and 1.5. However, as long as N can set an optimal interval, it is not limited thereto.

For example, the transmission antenna device 120 may be disposed such that the plurality of transmission antennas are located in an external area with respect to the receiving antenna device. As an example, in the transmission antenna device 120, the plurality of transmission antennas may be arranged to be divided into a left area and a right area with respect to the receiving antenna device in the second direction, and each area may include at least four transmission antennas. In addition, in the transmission antenna device 120, the plurality of transmission antennas may be arranged in three stages at the same vertical interval along the first direction, and three stages may be disposed at an upper side above an upper stage of the plurality of receiving antennas, at a lower side below a lower stage of the plurality of receiving antennas, and at a middle side between the upper stage and the lower stage. Here, at least two or more transmission antennas may be included on the upper side above the upper stage and the lower side below the lower stage, respectively, and at least four or more transmission antennas may be included on the middle side between the upper stage and the lower stage.

Furthermore, for example, in the transmission antenna device 120, the plurality of transmission antennas may be arranged to have the vertical interval of a third interval. The transmission antennas disposed at the upper side above the upper stage and at the lower side below the lower stage may be arranged to have the horizontal interval of a fourth interval along the second direction, and the transmission antennas disposed on the middle side between the upper stage and the lower stage may be arranged such that a near interval and a far interval between the transmission antennas have a fifth interval and a sixth interval, respectively, in the second direction. Here, each interval is set based on the wavelength of the transmission signal. The third interval may be N multiples of eight wavelengths 8λ, the fourth interval may be N multiples of twenty-four wavelengths 24λ. In addition, the fifth interval may be N multiples of one and a half wavelengths 1.5λ, and the sixth intervals may be N multiples of twenty-three wavelengths 23λ. Specifically, the plurality of transmission antennas included in the transmission antenna device 120 may be arranged to be spaced apart from each other at a vertical interval of 8N times the wavelength of the transmission signal. In addition, the transmission antennas disposed on the upper side above the upper stage and the lower side below the lower stage may be spaced apart so as to have a horizontal interval of 24 N times the wavelength of the transmission signal. In addition, the transmission antennas disposed on the middle side between the upper stage and the lower stage may be spaced apart at a horizontal near interval of 1.5 N times the wavelength of the transmission signal, and may be arranged so as to be spaced apart by a horizontal far interval of 23N times the wavelength of the transmission signal. Here, N may be set to any real number between 0.5 and 1.5, but is not limited thereto as long as an optimal interval can be set. However, N may be set to the same value as a multiple for setting the interval between the receiving antennas and the interval between the transmission antennas.

Figure 2:
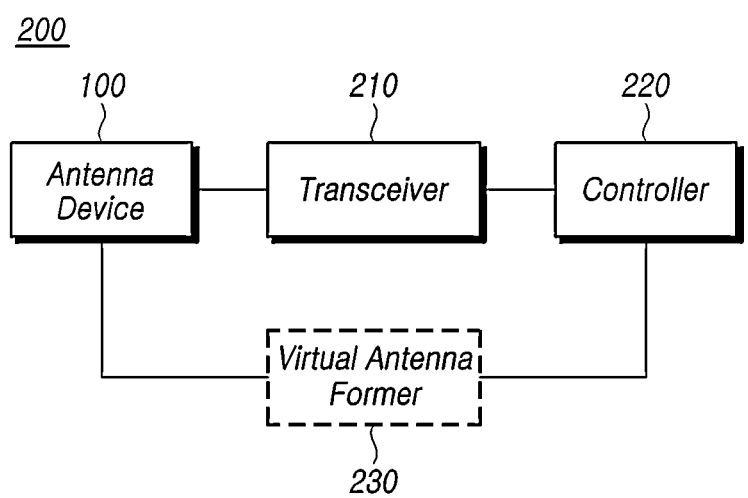
FIG. 2 illustrates a configuration of a radar device according to an embodiment of the present disclosure.

FIG. 2 illustrates a configuration of a radar device according to an embodiment of the present disclosure.

Referring to FIG. 2, a radar device 200 according to an embodiment of the present disclosure may include an antenna device 100 including a receiving antenna device in which a plurality of receiving antennas are arranged in two stages at the same vertical interval in a first direction and sequentially arranged to have the same horizontal interval in a second direction, and a transmission antenna device disposed such that a plurality of transmission antennas are located in an external area with respect to the receiving antenna device, a transceiver 210 for transmitting a transmission signal from at least one of the plurality of transmission antennas and receiving the reflection signal reflected from an object through the plurality of receiving antennas, and controller 220 for acquiring information on the object by processing the reflection signal received through the plurality of receiving antennas. The radar device may mean a radar sensor. The transceiver 210 may be implemented by being included in the controller 220.

For example, in the antenna device 100, the plurality of receiving antennas may be arranged in two stages at the same vertical interval in a first direction and sequentially arranged to have the same horizontal interval in a second direction. As an example, in the antenna device 100, the plurality of receiving antennas may be divided into an upper stage and a lower stage in the first direction and arranged in two stages, and each stage may include at least eight or more receiving antennas. In addition, in the antenna device 100, the plurality of receiving antennas may be sequentially arranged side by side to have the same horizontal interval.

As another example, in the antenna device 100, the transmission antenna device may be disposed such that a plurality of transmission antennas are located in an external area with respect to the receiving antenna device. For example, in the antenna device 100, the plurality of transmission antennas may be arranged to be divided into a left area and a right area with respect to the receiving antenna device in the second direction, and each area may include at least four transmission antennas. In addition, in the antenna device 100, the plurality of transmission antennas may be arranged in three stages at the same vertical interval along the first direction, and three stages may be disposed at an upper side above an upper stage of the plurality of receiving antennas, at a lower side below a lower stage of the plurality of receiving antennas, and at a middle side between the upper stage and the lower stage.

For example, the transceiver 210 may transmit a transmission signal from at least one of a plurality of transmission antennas and receive a reflection signal reflected from an object through the plurality of receiving antennas. For example, the transceiver 210 may transmit a transmission signal through the switched transmission antenna by switching to one of a plurality of transmission antennas included in the antenna device 110 or may transmit a transmission signal through multiple transmission channels allocated to a plurality of transmission antennas. Specifically, the transceiver 210 may be controlled to transmit a code-divided transmission signal from a transmission antenna and receive a reflection signal from all receiving antennas.

In addition, for example, the transceiver 210 may include an oscillator, an amplifier, a mixing unit, and a converter. Specifically, the transceiver 210 may include an oscillator for generating a transmission signal for one transmission channel allocated to the switched transmission antenna or multi-transmission channels allocated to a plurality of transmission antennas. The oscillator may include, for example, a voltage-controlled oscillator (VCO) and an oscillator. The receiver may receive a reception signal received by being reflected from an object through a receiving antenna. In addition, the transceiver 210 may include a low-noise amplifier (LNA) for low-noise amplification of a reception signal received through one receiving channel allocated to the switched receiving antenna or received through a multi-receiving channel allocated to a plurality of receiving antennas, a mixer for mixing the low-noise amplified reception signal, an amplifier for amplifying the mixed reception signal, and a converter (e.g., an analog digital converter) for digitally converting the amplified reception signal to generate reception data. That is, the transceiver 210 may transmit the transmission signal from the plurality of transmission antennas and receive the reception signals from the plurality of receiving antennas and the virtual receiving antenna to detect information about the object with high resolution. Here, the information on the object may mean location information or speed information of the object detected within the detection area of the radar device.

For example, the controller 220 may obtain information about the object by processing the reflection signal received through the plurality of receiving antennas. For example, the controller 220 may acquire location information of the object by comparing and analyzing a transmission signal transmitted from at least one of the plurality of transmission antennas and a reception signal received from the plurality of receiving antennas. Specifically, the controller 220 may acquire position information such as an azimuth angle of an object using a transmission signal transmitted by code division from a plurality of transmission antennas and a reception signal received from a plurality of receiving antennas.

As another example, the controller 220 may acquire position information of the object by performing frequency conversion. Specifically, the controller 220 may control generation of a transmission signal, synchronize transmission data and reception data, and perform frequency conversion. The control unit 220 may perform frequency conversion after buffering the acquired transmission data and reception data to a unit sample size which can be processed per one cycle. Here, the frequency conversion may be performed by using a Fourier transform such as a Fast Fourier Transform (FFT). Then, the controller 220 may perform a constant false alarm rate (CFAR) operation, a tracking operation, and a target selection operation based on the frequency-converted reception data, and may acquire the angle information, speed information and distance information on the object.

As another example, the controller 220 may provide information on the object to an advanced driver assistance systems (ADAS) included in the vehicle in which the radar device 200 is installed. For example, the controller 220 may obtain information on the object based on the reflection signal, and transmit the obtained information on the object to the driver assistance system requesting detection data. Accordingly, information on the object detected by the radar device 200 may be provided to the driver assistance system provided in the vehicle, thereby providing the stability and convenience to the driver of the vehicle.

In addition, the radar device 200 according to an embodiment of the present disclosure may further include a virtual antenna former 230 which controls to form a plurality of virtual receiving antennas. As an example, the virtual antenna former 230 may perform signal processing for generating a signal having a predetermined phase difference, which may be determined according to a receiving antenna interval, based on a signal received by a real receiving antenna. For example, the virtual antenna former 230 may perform signal processing to generate a virtual signal as if a signal is received through a virtual receiving antenna which is virtually disposed at a location where a real receiving antenna is not disposed. Here, the virtual signal may be a signal in which a phase difference is generated based on an actually received signal. In addition, in the present disclosure, "a virtual antenna is formed" may have the same meaning as "a reception signal that is not actually received is created". That is, the arrangement structure (interval, number, etc.) of the virtual receiving antenna may have the same meaning as the structure (interval, number, etc.) in which reception signals that are not actually received are generated.

As another example, the virtual antenna former 230 may include a plurality of virtual receiving antennas existing virtually as well as a plurality of receiving antennas actually existing at the receiving side. In this way, an antenna structure in which a plurality of virtual receiving antennas are virtually further included at the receiving side may be referred as an "antenna structure having a virtual aperture structure".

In addition, the transceiver 210, the controller 220 and the virtual antenna former 230 included in the radar device 200 according to an embodiment of the present disclosure may be implemented as a radar control device or some module of an ECU for performing an object identification function by radar. In addition, the radar control device or ECU may include a processor and a storage device such as a memory, and a computer program capable of performing a specific function. That is, the transceiver 210, the controller 220 and the virtual antenna former 230 may be implemented as software modules capable of performing respective specific functions.

Figure 3:
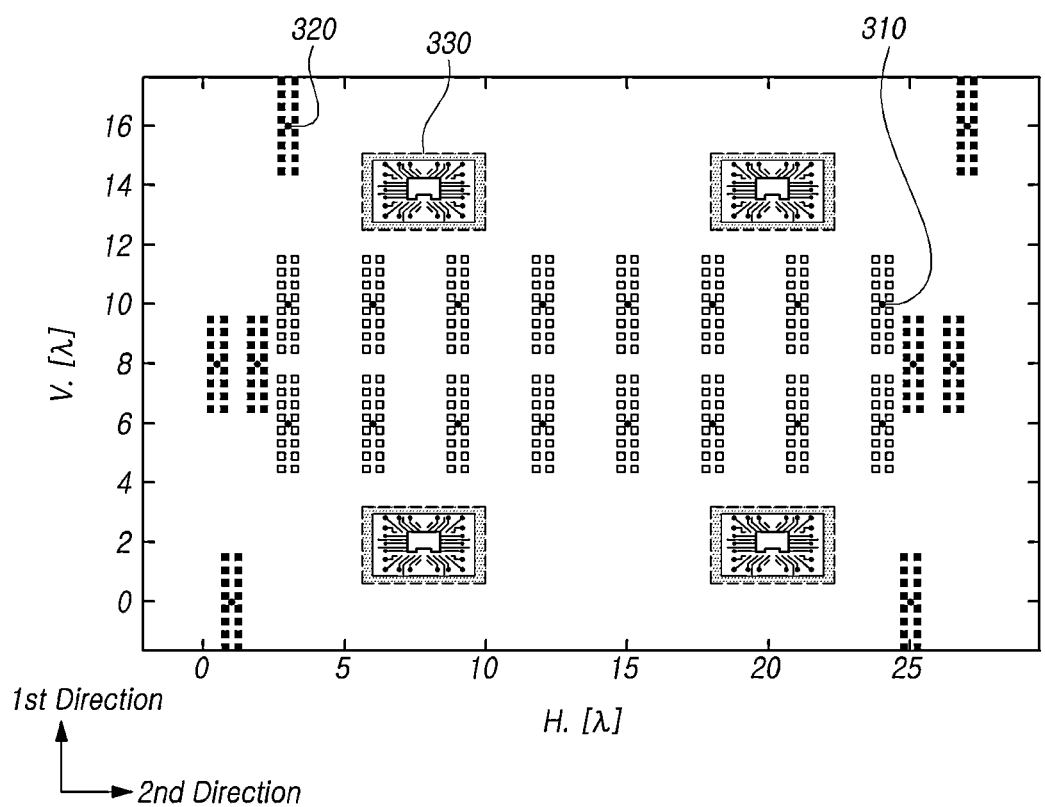
FIG. 3 is a diagram for explaining the arrangement of the antennas included in the antenna device according to an embodiment of the present disclosure.

FIG. 3 is a diagram for explaining the arrangement of the antennas included in the antenna device according to an embodiment of the present disclosure.

Referring to FIG. 3, the arrangement of the antenna and the multi-function integrated circuit (MMIC) included in the antenna device according to an embodiment of the present disclosure may be described. The multi-function integrated circuit described as an example may be a circuit including four receiving antennas (receiving channels) and two transmission antennas (transmission channels). Accordingly, FIG. 3 describes a case of using four multi-function integrated circuits as an example, but if it includes at least 8 or more receiving antennas and at least 4 transmission antennas, the number of multi-function integrated circuits is not limited thereto. In addition, the position of the antenna may refer to a reference point (e.g., center) of the antenna.

As an example, the receiving antenna 310 may be disposed in the center region of the circuit board on which the antenna is provided. In addition, the receiving antennas 310 may be arranged in two stages at the same vertical interval in the first direction, and may be sequentially arranged to have the same horizontal interval in the second direction. For example, the receiving antenna 310 may be arranged to be divided into an upper stage and a lower stage in the first direction. In addition, in each stage, at least 8 or more receiving antennas 310 may be arranged in parallel with each other horizontally. Details regarding the arrangement interval of the receiving antenna 310 will be described later with reference to FIG. 4.

For example, the transmission antenna 320 may be disposed to be located in an external area with respect to the plurality of receiving antennas on the circuit board on which the antennas are provided. In addition, the transmission antennas 320 may be arranged in three stages at the same vertical interval in the first direction. For example, the transmission antenna 320 may be dividedly disposed on an upper side above the upper stage where the plurality of receiving antennas 310 are disposed, a lower side below the lower stage where the plurality of receiving antennas 310 are disposed, and the middle side between the upper stage and the lower stage. In addition, at least two or more transmission antennas 320 may be horizontally disposed on the upper side above the upper stage and the lower side below the lower stage, respectively, and at least four or more transmission antennas 320 may be disposed on the middle side between the upper stage and the lower stage. As another example, the transmission antenna 320 may be divided into a left area and a right area with respect to the plurality of receiving antennas 310 in the second direction. In addition, at least four transmission antennas 320 may be disposed in each area. Details regarding the arrangement interval of the transmission antenna 320 will be described later with reference to FIG. 4.

Here, each receiving antenna 310 and each transmission antenna 320 may include a plurality of patches. In addition, signals received by the plurality of patches may be integrated and used as a single signal without changing a phase relationship between the signals.

In addition, as an example, the multi-function integrated circuit (MMIC) 330 may be disposed in an empty space between the antennas. Alternatively, the multi-function integrated circuit 330 may be disposed on the front side of the circuit board on which the antenna is provided or on the rear surface of the circuit board. Here, the circuit board is a high-frequency circuit board, and the front surface of the circuit board may be the side of the circuit board on which the transmission/receiving antenna is disposed. In addition, the rear surface of the circuit board may be a different side from a side where the transmission/receiving antennas are disposed. For example, the multi-function integrated circuit 330 may be disposed on a circuit board such that the length of the feed line is minimal and uniform. Specifically, if the multi-function integrated circuit 330 is disposed on the front surface of the circuit board, the conduction connection passing through the circuit board may be omitted. On the other hand, if the multi-function integrated circuit 330 is disposed on the rear surface of the circuit board, it may not be visible on the surface, but a greater degree of freedom with respect to positioning may be obtained. In addition, if the multi-function integrated circuit 330 is placed on the rear surface of the circuit board, there may have short connection lines to other signal processing components and may be better protected from interference projection of electromagnetic signals through the metal layer inside the circuit board between the front and rear surface. However, an embodiment of the present disclosure is not limited to any one of the front surface and the rear surface.

Figure 4:
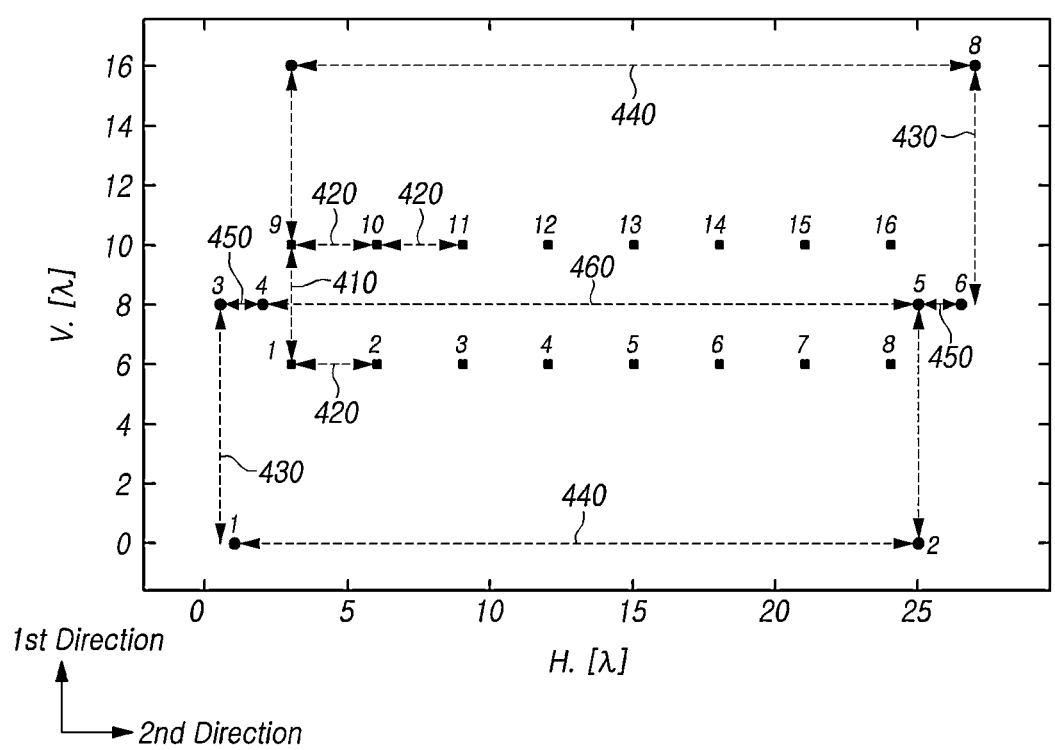
FIG. 4 is a diagram for explaining an arrangement interval of the antennas included in an antenna device according to an embodiment of the present disclosure.

FIG. 4 is a diagram for explaining an arrangement interval of the antennas included in an antenna device according to an embodiment of the present disclosure.

Referring to FIG. 4, an arrangement interval of antennas included in the antenna device according to an embodiment of the present disclosure may be described. In addition, FIG. 4 illustrates the antennas arranged with respect to a reference point (e.g., the center), and circles may represent 8 transmission antennas (transmission channels), and squares may represent 16 receiving antennas (receiving channels). In addition, the reference point of the antenna may mean a center point of an electric field formed by the antenna or a center of gravity of the antenna.

For example, in the receiving antenna device 110, the plurality of receiving antennas may be arranged in two stages at the same vertical interval in the first direction, and may be sequentially arranged to have the same horizontal interval in the second direction. For example, when viewing the lower receiving antenna RX1 as a reference, the upper receiving antenna RX9 may be disposed to be spaced apart from each other by a vertical interval 410 in the first direction. In addition, the lower receiving antenna RX2 may be disposed to be spaced apart by a horizontal interval 420 in the second direction. In addition, the other receiving antennas RX3 to RX8 disposed at the lower stage may be sequentially disposed while being spaced apart by the same horizontal interval 420 in the second direction. The other receiving antennas RX10 to RX16 disposed on the upper stage may be sequentially disposed while being spaced apart by the same horizontal interval 420 in the second direction from the upper receiving antenna RX9. As a specific example, the vertical interval 410 between the plurality of receiving antennas may be 4N times the wavelength λ of the transmission signal. The horizontal interval 420 between the plurality of receiving antennas may be 3N times the wavelength λ of the transmission signal.

In addition, as an example, in the transmission antenna device 120, a plurality of transmission antennas may be arranged in three stages at the same vertical interval in the first direction. In addition, the transmission antennas may be disposed to have the same horizontal interval 440 in the second direction in the case of the upper and lower sides of the three stages. In addition, in the case of the middle side of the three stages, the transmission antenna may be disposed to have a near interval 450 or a far interval 460 in the second direction. For example, when viewing with respect to the lower transmission antenna TX1, the transmission antennas TX3 to TX6 in the middle side may be disposed to be spaced apart from each other by a vertical interval 430 in the first direction. In addition, the upper transmission antennas TX7 and TX8 may be equally spaced apart from the middle transmission antennas by the vertical interval 430 in the first direction.

For another example, the upper transmission antennas TX7 and TX8 may be disposed to be spaced apart by a horizontal interval 440. In addition, the lower transmission antennas TX1 and TX2 may also be disposed to be spaced apart by a horizontal interval 440. In addition, when viewed based on the transmission antenna TX4 of the middle side, the transmission antenna TX3 of the middle side is horizontally spaced apart by a near interval 450, and the transmission antenna TX5 of the middle side is horizontally spaced apart by a far interval 460. In addition, when viewed with respect to the transmission antenna TX5 of the middle side, the transmission antenna TX6 of the middle side may be horizontally spaced apart by a near interval 450. As a specific example, the vertical interval 430 between the plurality of transmission antennas may be 8N times wavelength λ of the transmission signal, and the horizontal interval 420 between the upper and lower transmission antennas may be 24N times the transmission signal wavelength λ. In addition, the horizontal near interval 450 between the transmission antennas disposed on the middle side may be 1.5N times the transmission signal wavelength λ, and the far interval 460 may be 23N times the transmission signal wavelength λ. Here, N may be set to any real number between 0.5 and 1.5, but is not limited thereto as long as an optimal interval can be set. However, N may be set to the same value as a multiple for setting the interval between the receiving antennas and the interval between the transmission antennas.

Accordingly, specifically, the relative position between the transmission antennas and the receiving antenna may be as follows. With respect to the receiving antenna RX9 as a reference, the transmission antenna TX7 may be disposed at a position of 6N multiples of the wavelength upward in the first direction, and at the same position in the second direction. In addition, the transmission antenna TX4 may be disposed at a position that is N multiples of the wavelength to the left with respect to the receiving antenna RX9. In addition, when the receiving antenna RX16 is used as a reference, the transmission antenna TX5 may be disposed at a position that is N multiples of the wavelength to the right. In addition, with respect to the transmission antenna TX5 disposed inside the right side of the transmission antennas, the transmission antenna TX2 may be disposed at a position that is 8N multiples of the wavelength downward in the first direction, and at the same position in the second direction. However, the virtual antenna may be formed regardless of the relative position between the transmission antenna and the receiving antenna. Accordingly, the relative position between the transmission antenna and the receiving antenna is not limited thereto.

Figure 5:
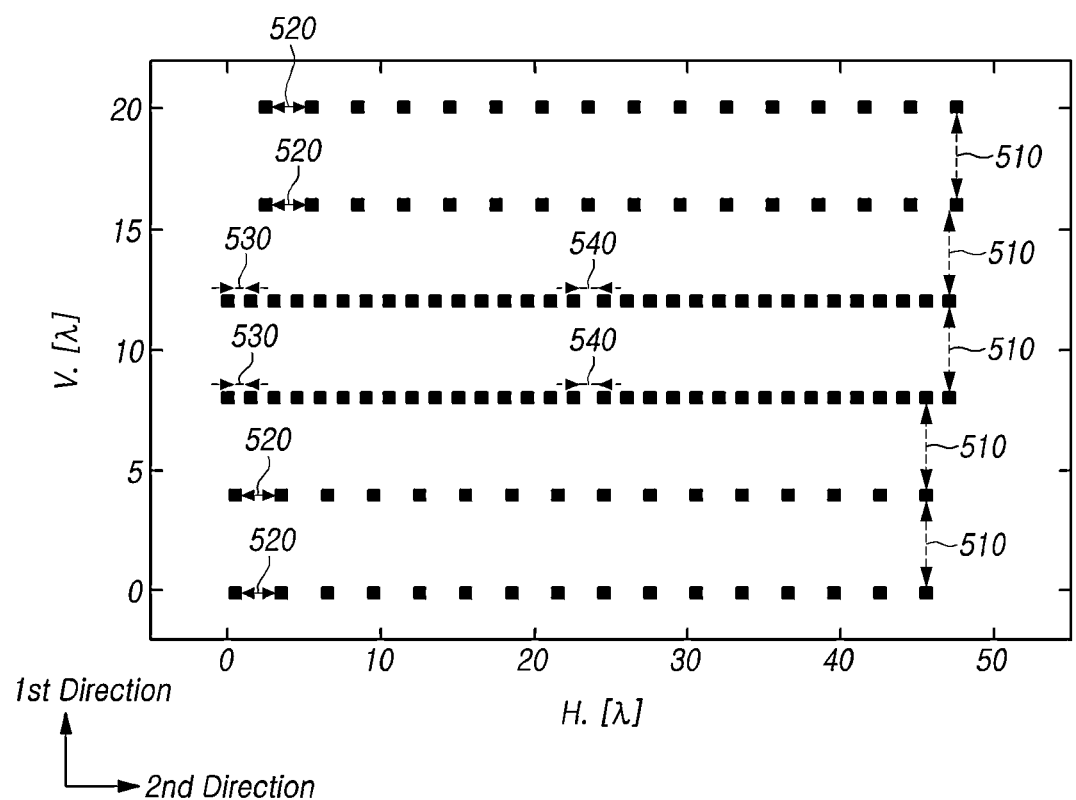
FIG. 5 is a diagram for explaining a virtual antenna formed by disposition of the antennas according to an embodiment of the present disclosure.

FIG. 5 is a diagram for explaining a virtual antenna formed by disposition of the antennas according to an embodiment of the present disclosure.

Referring to FIG. 5, there may be described that an antenna arrangement according to an embodiment of the present disclosure is famed as a virtual antenna through a MIMO system. As an example, the antenna device 100 may form at least 128 virtual antennas by using the arrangement of at least 8 transmission antennas and at least 16 receiving antennas. Here, the virtual antenna may be a virtual RX antenna which is virtually existing due to the separation of the transmission antennas transmitting signals at the same time, unlike a real RX antenna.

For example, the virtual antenna may be formed in six stages to be spaced apart by the same vertical interval 510 in the first direction, an, in each stage, virtual antennas may be formed to be spaced apart by the same horizontal interval. For example, the vertical interval 510 in the first direction between the virtual antennas may be 4N multiples of the wavelength. Specifically, the vertical interval 510 between the virtual antennas formed by the six stages may be 4N times the wavelength of the transmission signal. For another example, in the upper and upper stages except for the middle two stages among the six stages, virtual antennas may be formed to be spaced apart by a horizontal interval 520 in the second direction. In particular, the upper two stages or the lower two stages may be generated horizontally in parallel with each other. Specifically, the horizontal interval 520 between the virtual antennas may be 3.5N times the wavelength of the transmission signal in the upper and lower stages except for the middle two stages among the six stages. As another example, in the middle two stages among the six stages, virtual antennas may be formed to be spaced apart by a horizontal interval 530 in the second direction. However, in the central portion of each stage, virtual antennas may be formed at different horizontal intervals 540. Specifically, in the center two stages among the six stages, the horizontal interval 530 between the virtual antennas may be 1.5N times the wavelength of the transmission signal. However, in the central portion of each stage, the virtual antennas may be spaced apart by 2N times the wavelength of the transmission signal, and may be formed at a horizontal interval 540 different from the horizontal interval 530 in other portions.

For example, the antenna device 100 may increase the accuracy of object detection by forming an enlarged aperture structure through the virtual antenna. Here, the aperture means a distance between one end and the other end of the receiving antenna, and it may be a very important element of the radar device to greatly expand the aperture of the receiving antenna to have aperture performance. For example, the antenna device 100 may precisely measure information about an object by securing extended aperture performance through the arrangement of antennas as shown in FIGS. 3 and 4. More specifically, in the middle two stages of the formed virtual antennas, the aperture may be 47N multiples of the wavelength, and the interval in the central portions may be 2N times the wavelength.

Figure 6:
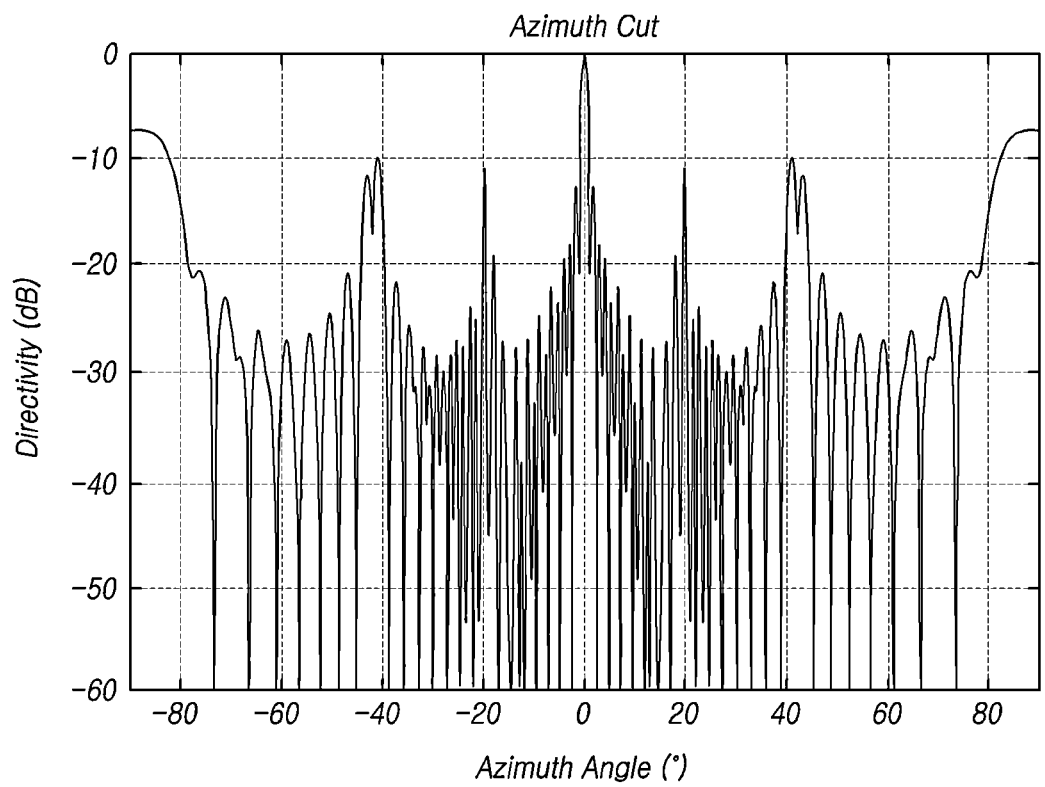
FIG. 6 is a diagram for explaining a composite beam pattern in a horizontal direction of a virtual antenna according to an embodiment of the present disclosure.

FIG. 6 is a diagram for explaining a composite beam pattern in a horizontal direction of a virtual antenna according to an embodiment of the present disclosure.

Referring to FIG. 6, the virtual antenna formed as described above may have high-resolution angular resolution. In addition, a half power beam width (HPBW) of the formed virtual antenna may be about −0.6 deg to +0.6 deg. Although this number may be increased or decreased depending on the characteristics of the antenna, there may guarantee the high angular resolution.

Figure 7:
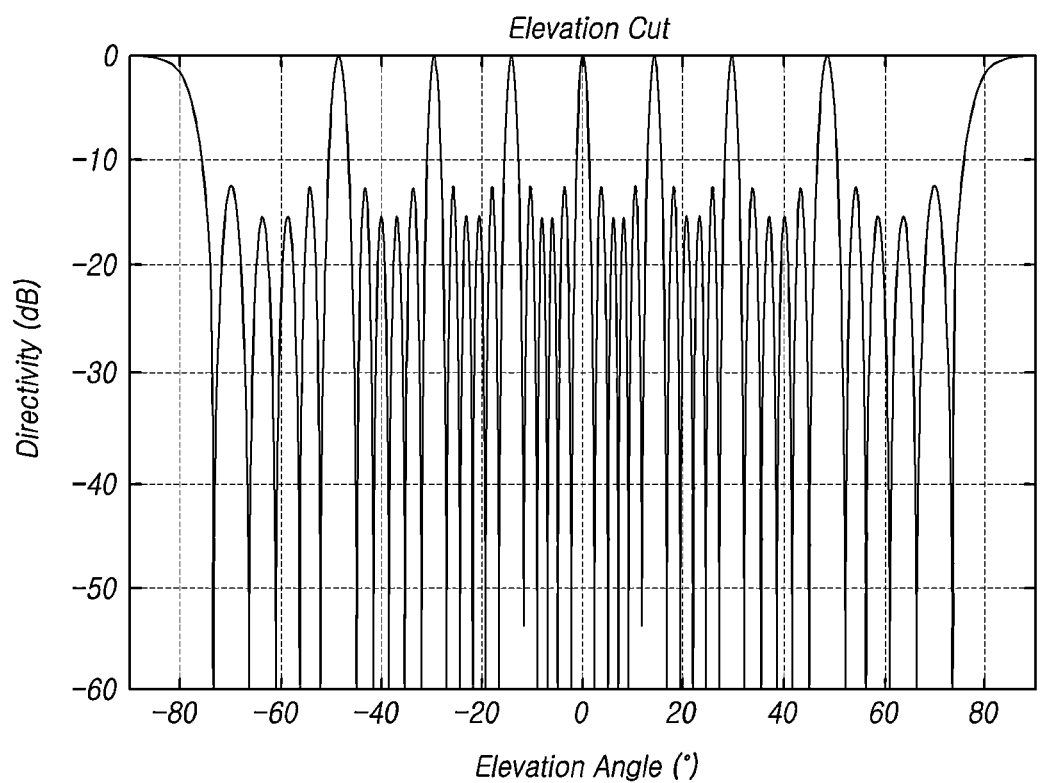
FIG. 7 is a diagram for explaining a composite beam pattern in a vertical direction of a virtual antenna according to an embodiment of the present disclosure.

FIG. 7 is a diagram for explaining a composite beam pattern in a vertical direction of a virtual antenna according to an embodiment of the present disclosure.

Referring to FIG. 7, the virtual antenna formed as described above may have high-resolution angular resolution. In addition, a half power beam width (HPBW) of the formed virtual antenna may be about −1.1 deg to +1.1 deg. Although this number may be increased or decreased depending on the characteristics of the antenna, there may guarantee the high angular resolution.

As described above, according to an antenna device and a radar device of the present disclosure, a plurality of receiving antennas may be arranged at the same vertical and horizontal intervals and a plurality of transmission antennas may be located in an area outside of the receiving antenna, so that it is possible to minimize the space occupied by the antenna while uniformly forming an arrangement interval of the virtual antenna.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure.

What is claimed is:

1. An antenna device used in a radar device comprising:
   a receiving antenna device in which a plurality of receiving antennas are arranged in two stages at the same vertical interval in a first direction and sequentially arranged to have the same horizontal interval in a second direction; and
   a transmission antenna device disposed such that a plurality of transmission antennas are located in an external area with respect to the receiving antenna device,
   wherein the plurality of transmission antenna include upper transmission antennas disposed at an upper side above an upper stage of the plurality of receiving antennas, lower transmission antennas disposed at a lower side below a lower stage of the plurality of receiving antennas, and middle transmission antennas disposed at a middle side between the upper stage and the lower stage of the plurality of receiving antennas, and
   wherein all of the middle transmission antennas are disposed at the left outside of a leftmost receiving antenna and the right outside of a rightmost receiving antenna.

2. The antenna device of claim 1, wherein, in the receiving antenna device, the plurality of receiving antennas are divided into the upper stage and the lower stage in the first direction and arranged in the two stages, and each stage includes at least eight or more receiving antennas.

3. The antenna device of claim 1, wherein, in the receiving antenna device, the plurality of receiving antennas are spaced apart from each other by the vertical interval of a first interval, and are arranged to be spaced apart from each other at the horizontal interval of a second interval.

4. The antenna device of claim 3, wherein the first interval is N multiples of four wavelengths 4λ, and the second interval is N multiples of three wavelengths 3λ.

5. The antenna device of claim 1, wherein, in the transmission antenna device, the plurality of transmission antennas are arranged to be divided into a left area and a right area with respect to the receiving antenna device in the second direction, and each area includes at least four transmission antennas.

6. The antenna device of claim 1, wherein, in the transmission antenna device, the plurality of transmission antennas are arranged in three stages at the same vertical interval along the first direction.

7. The antenna device of claim 6, wherein, in the transmission antenna device, each of the upper transmission antennas and the lower transmission antennas includes at least two or more transmission antennas, and the middle transmission antennas includes at least four or more transmission antennas.

8. The antenna device of claim 6, wherein, in the transmission antenna device,
   the plurality of transmission antennas are arranged to have the vertical interval of a third interval,
   the upper transmission antennas and the lower transmission antennas are arranged to have the horizontal interval of a fourth interval along the second direction, and the middle transmission antennas are arranged such that a near interval between adjacent two transmission antennas is a fifth interval and a far interval between two transmitting antennas at both ends in the second direction is a sixth interval in the second direction.

9. The antenna device of claim 8, wherein the third interval is eight wavelengths $8\lambda$, the fourth interval is twenty-four wavelengths $24\lambda$, the fifth interval is one and a half wavelengths $1.5\lambda$, and the sixth interval is twenty-three wavelengths $23\lambda$.

10. A radar device comprising:
an antenna device comprising a receiving antenna device in which a plurality of receiving antennas are arranged in two stages at the same vertical interval in a first direction and sequentially arranged to have the same horizontal interval in a second direction, and a transmission antenna device disposed such that a plurality of transmission antennas are located in an external area with respect to the receiving antenna device; and
a controller configured to transmit a transmission signal from at least one of the plurality of transmission antennas and acquire information on an object by processing a reflection signal reflected from the object through the plurality of receiving antennas,
wherein the plurality of transmission antenna include upper transmission antennas disposed at an upper side above an upper stage of the plurality of receiving antennas, lower transmission antennas disposed at a lower side below a lower stage of the plurality of receiving antennas, and middle transmission antennas disposed at a middle side between the upper stage and the lower stage of the plurality of receiving antennas,
wherein all of the middle transmission antennas are disposed at the left outside of a leftmost receiving antenna and the right outside of a rightmost receiving antenna.

11. The radar device of claim 10, wherein, in the antenna device, the plurality of receiving antennas are divided into the upper stage and the lower stage in the first direction and arranged in the two stages, and each stage includes at least eight or more receiving antennas.

12. The radar device of claim 10, wherein, in the antenna device, the plurality of receiving antennas are spaced apart from each other by the vertical interval of a first interval, and are arranged to be spaced apart from each other at the horizontal interval of a second interval.

13. The radar device of claim 10, wherein, in the antenna device, the plurality of transmission antennas are arranged to be divided into a left area and a right area with respect to the receiving antenna device in the second direction, and each area includes at least four transmission antennas.

14. The radar device of claim 10, wherein, in the antenna device, the plurality of transmission antennas are arranged in three stages at the same vertical interval along the first direction.

15. The radar device of claim 14, wherein, in the antenna device, each of the upper transmission antennas and the lower transmission antennas includes at least two or more transmission antennas, and the middle transmission antennas includes at least four or more transmission antennas.

* * * * *